(12) United States Patent
Wingen

(10) Patent No.: US 9,945,616 B1
(45) Date of Patent: Apr. 17, 2018

(54) WASTE HEAT RECOVERY SYSTEM FOR A FLUID HEATER

(71) Applicant: Patrick G. Wingen, Elk Point, SD (US)

(72) Inventor: Patrick G. Wingen, Elk Point, SD (US)

( * ) Notice: Subject to any disclaimer, the term of this patent is extended or adjusted under 35 U.S.C. 154(b) by 0 days.

(21) Appl. No.: 13/903,592

(22) Filed: May 28, 2013

(51) Int. Cl.
F22D 5/00 (2006.01)
F28D 15/00 (2006.01)

(52) U.S. Cl.
CPC .................................. F28D 15/00 (2013.01)

(58) Field of Classification Search
CPC ... F22D 1/36; F22D 5/06; F22D 11/06; F22D 11/00; F24D 17/0078; F24D 19/1012; F22B 29/02; F22B 37/22; F22B 35/14; F24H 1/406
USPC .......... 122/15.1, 18.1, 31.1, 7 R, 406.1, 415; 165/104.11, 104.13, 104.14
See application file for complete search history.

(56) References Cited

U.S. PATENT DOCUMENTS

| | | | |
|---|---|---|---|
| 1,046,946 A | 12/1912 | Beatty | |
| 2,479,766 A | 8/1949 | Mulvany | |
| 2,703,073 A | 3/1955 | Klein | |
| 2,987,259 A | 6/1961 | Lindquist | |
| 3,177,659 A * | 4/1965 | Berman | F01K 23/106 122/32 |
| 4,103,706 A | 8/1978 | Moog | |
| 4,163,430 A | 8/1979 | Neumann | |
| 4,241,588 A | 12/1980 | Murphy | |
| 4,274,553 A | 6/1981 | Evers | |
| 4,284,127 A | 8/1981 | Collier | |
| 4,318,367 A | 3/1982 | Antonucci | |
| 4,339,249 A * | 7/1982 | Berkestad | F22B 1/1876 122/336 |
| 4,401,261 A | 8/1983 | Brown | |
| 4,429,830 A | 2/1984 | Forster | |
| 4,452,180 A | 6/1984 | Hassan | |
| 4,512,288 A | 4/1985 | Michaud | |
| 4,583,494 A | 4/1986 | Gordon | |

(Continued)

OTHER PUBLICATIONS

ECOS Mobile Wash/Reclaim System, www.landa.com, download date Mar. 7, 2012.

(Continued)

Primary Examiner — Gregory A Wilson
(74) Attorney, Agent, or Firm — Jeffrey A. Proehl; Woods, Fuller, Shultz & Smith, P.C.

(57) ABSTRACT

A fluid heating apparatus may comprise a fluid pumping assembly configured to increase a pressure characteristic of the fluid between the fluid inlet and fluid outlet, and a heating assembly configured to heat the fluid between the fluid inlet and the fluid outlet. The heating assembly may define a first portion of a gas path such that exhaust gases from combustion in the heating assembly enter the gas path. The apparatus may also comprise a heat recovery assembly configured to recover heat from the exhaust gases and transfer recovered heat to fluid moving through the fluid path. The heat recovery assembly may define a second portion of the gas path in fluid communication with the first portion of the gas path. An exhaust gas movement device may be configured to pull exhaust gases through the first and second portions of the gas path to the gas movement device.

25 Claims, 8 Drawing Sheets

(56) References Cited

U.S. PATENT DOCUMENTS

| | | | |
|---|---|---|---|
| 4,628,869 A | 12/1986 | Symsek | |
| 4,844,020 A | 7/1989 | Bruhn | |
| 4,940,082 A | 7/1990 | Roden | |
| 5,570,578 A | 11/1996 | Saujet | |
| 5,575,244 A * | 11/1996 | Dethier | F22B 1/1815 122/406.1 |
| 5,745,043 A | 4/1998 | Lemke | |
| 6,183,161 B1 | 2/2001 | Neeper | |
| 6,345,769 B2 | 2/2002 | MacIntyre | |
| 6,532,906 B1 | 3/2003 | Knoeppel | |
| 6,564,755 B1 | 5/2003 | Whelan | |
| 6,612,267 B1 * | 9/2003 | West | F24D 3/08 122/13.3 |
| 6,971,335 B2 * | 12/2005 | Kobayashi | F24H 8/006 122/122 |
| 7,021,554 B2 | 4/2006 | Clark | |
| 7,258,080 B2 | 8/2007 | Missoum | |
| 7,360,535 B2 | 4/2008 | Kobayashi | |
| 7,392,767 B2 | 7/2008 | Franklin | |
| 7,458,340 B2 * | 12/2008 | Takeda | F24H 1/40 122/31.1 |
| 7,692,393 B2 | 4/2010 | Caamano | |
| 8,366,014 B2 * | 2/2013 | Ene | F24H 1/43 122/18.4 |
| 8,522,537 B2 * | 9/2013 | Lee | F01M 5/001 60/298 |
| 8,857,138 B2 | 10/2014 | Hansen | |
| 2005/0189437 A1 | 9/2005 | Alexander | |
| 2006/0027253 A1 | 2/2006 | Kaiser | |
| 2008/0011457 A1 | 1/2008 | Mirolli | |
| 2009/0117505 A1 | 5/2009 | Okayasu | |
| 2009/0317262 A1 | 12/2009 | Gilpatrick | |
| 2010/0186926 A1 | 7/2010 | Varlaro | |
| 2011/0131961 A1 * | 6/2011 | Lee | F01M 5/001 60/320 |
| 2011/0232696 A1 | 9/2011 | Barrios | |
| 2011/0253179 A1 | 10/2011 | Barrios | |
| 2014/0125122 A1 | 5/2014 | Johnson | |
| 2014/0216437 A1 | 8/2014 | Martian | |
| 2014/0217953 A1 * | 8/2014 | Chang | F01N 5/025 320/101 |
| 2014/0246517 A1 | 9/2014 | Raasch | |

OTHER PUBLICATIONS

Declaration Under 37 CFR 1.132 of Patrick G. Wingen, Aug. 2, 2017, 9 pages.

* cited by examiner

WASTE HEAT RECOVERY SYSTEM FOR A FLUID HEATER

BACKGROUND

Field

The present disclosure relates to fluid heating apparatus and more particularly pertains to a new waste heat recovery system for a fluid heater for capturing a portion of the heat exhausted from the apparatus that would otherwise be lost to the environment during operation.

Description of the Prior Art

A fluid heating apparatus is utilized to increase the temperature of a fluid at the outlet of the apparatus, and may also include a pump to increase the pressure of the fluid at the outlet. In some types of the fluid heater apparatus, a fuel is burned to generate the heat necessary to warm the fluid. The gases from the combustion heat a fluid carried in a convoluted tube of the apparatus, and then the exhaust gases leave the heating assembly of the apparatus and are vented to the environment.

A highly advantageous system for capturing a portion of the heat lost through the exhausted combustion gases is described in copending U.S. patent application Ser. No. 12/566,429 which is assigned to the same entity and the entirety of which is hereby incorporated by reference into this disclosure. The system disclosed in that application is suitable for use on heaters utilizing many types of burners, it is especially beneficial for use on fluid heaters with naturally-aspirated burners.

SUMMARY

In view of the foregoing, the present disclosure describes a new system for waste heat recovery for a fluid heater which may be utilized to capture a portion of the heat exhausted from the apparatus that would otherwise be lost to the environment during operation.

In one aspect, the present disclosure relates to a fluid heating apparatus having a fluid inlet, a fluid outlet, and a fluid path extending between the fluid inlet and fluid outlet. The apparatus may comprise a fluid pumping assembly configured to increase a pressure characteristic of the fluid between the fluid inlet and fluid outlet, with the fluid pumping assembly forming a portion of the fluid path to increase the pressure of fluid moving along the fluid path. The apparatus may also comprise a heating assembly configured to heat the fluid between the fluid inlet and the fluid outlet, with the heating assembly forming a portion of the fluid path to increase a temperature of the fluid moving along the fluid path. The heating assembly may also define a first portion of a gas path such that exhaust gases from combustion in the heating assembly enter the gas path. The apparatus may further comprise a heat recovery assembly configured to recover heat from the exhaust gases, with the heat recovery assembly forming a portion of the fluid path to transfer recovered heat to fluid moving through the fluid path. The heat recovery assembly may also define a second portion of the gas path in fluid communication with the first portion of the gas path. The apparatus may still further include a gas movement device that is configured to pull gases through the first and second portions of the gas path to the gas movement device.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
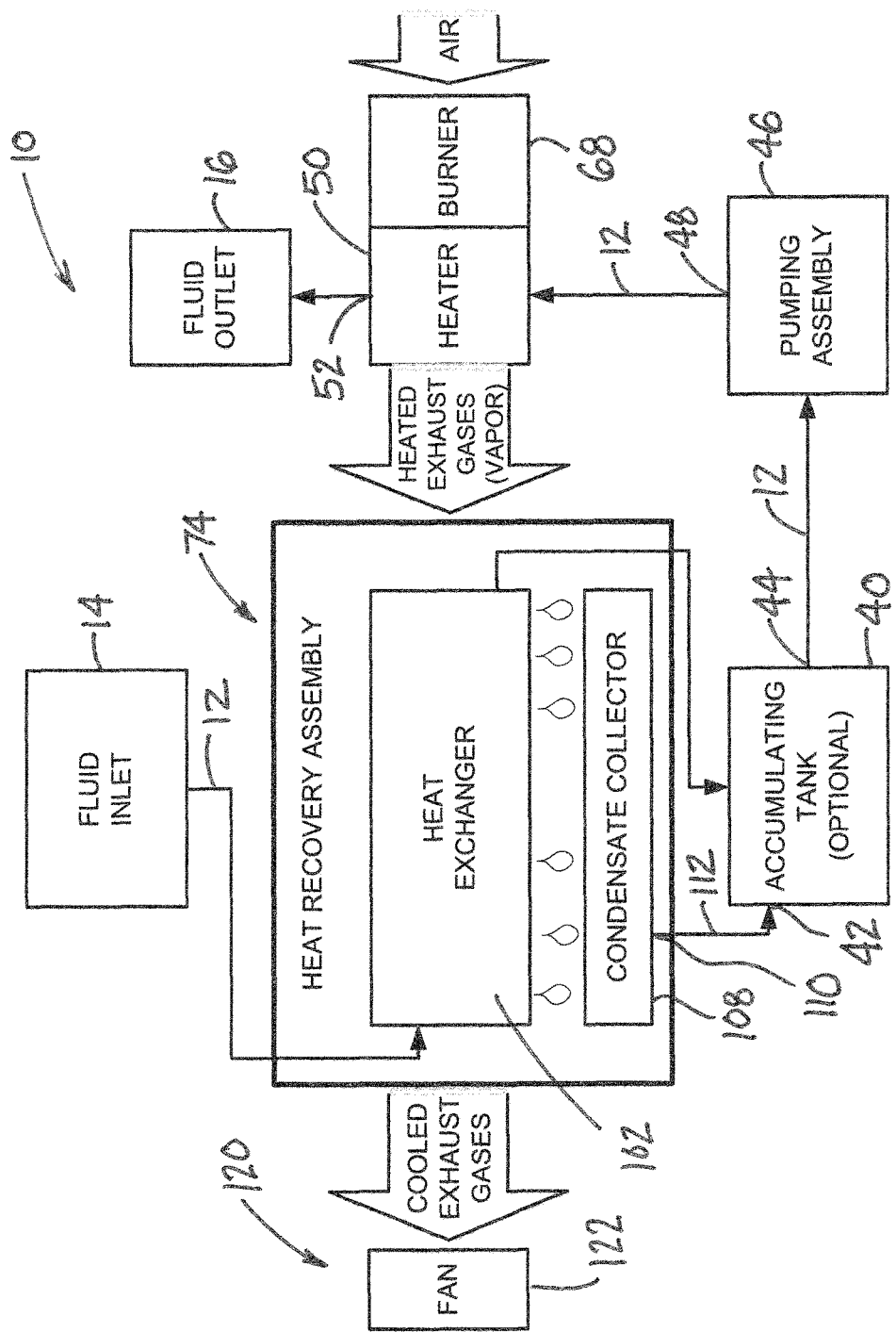
FIG. 1 is a schematic diagram of the new waste heat recovery system for a fluid heater, according to an illustrative embodiment employing a single heat exchanger.
Figure 2:
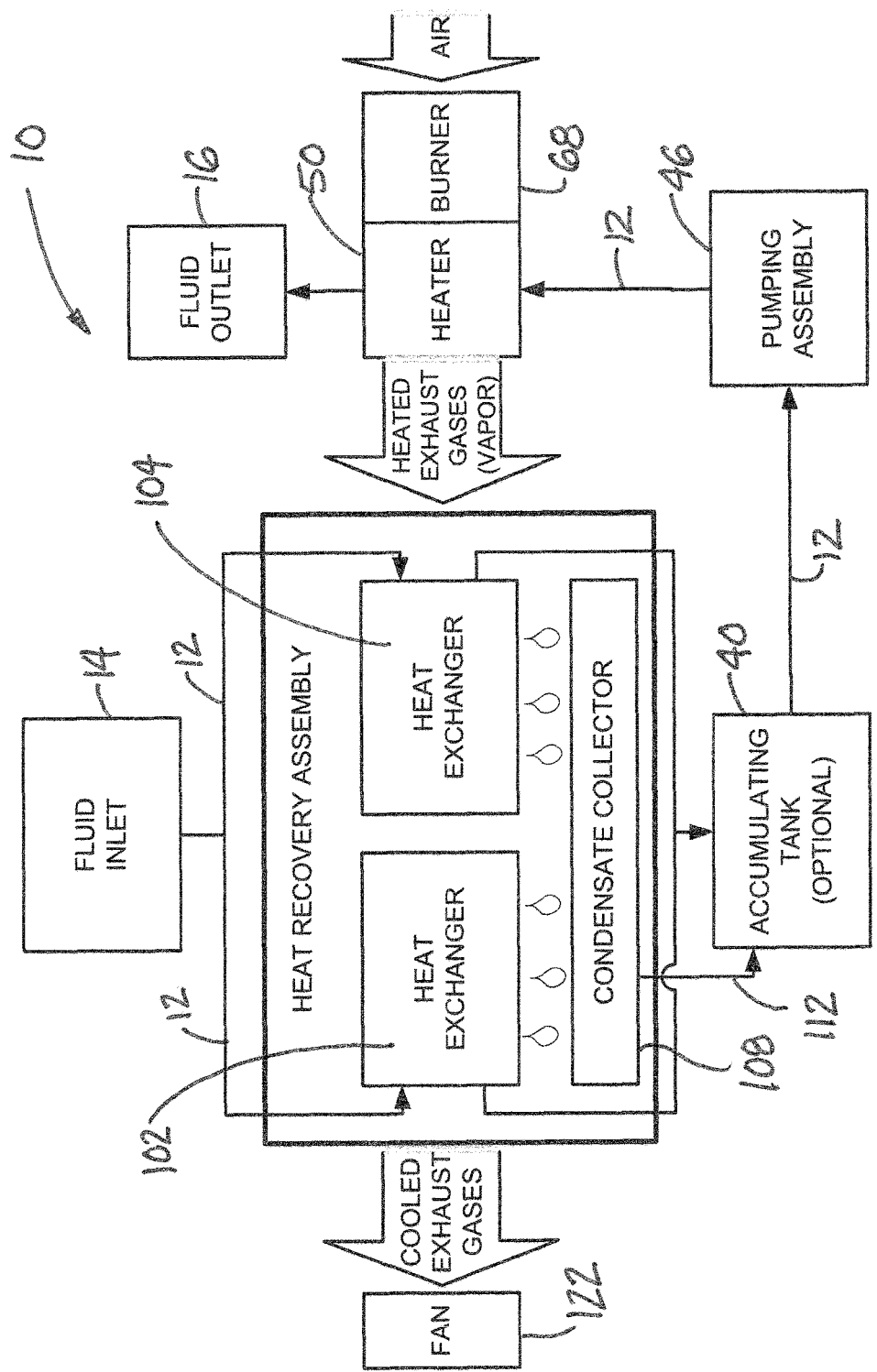
FIG. 2 is a schematic diagram of the system, according to an illustrative embodiment employing multiple heat exchangers with the fluid path passing through the exchangers in parallel.
Figure 3:
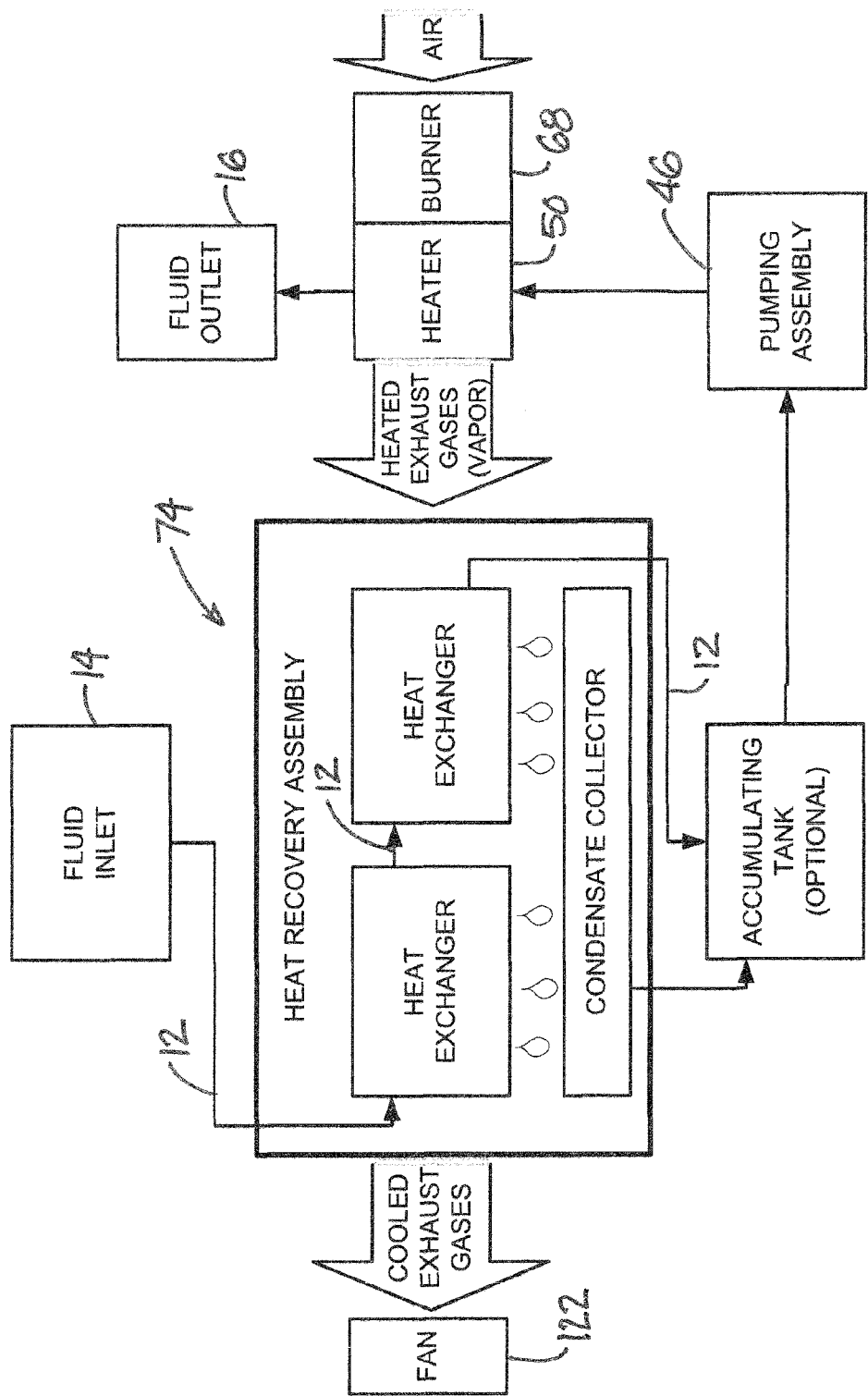
FIG. 3 is a schematic diagram of the system, according to an illustrative embodiment employing multiple heat exchangers with the fluid path passing through the exchangers in series.
Figure 4:
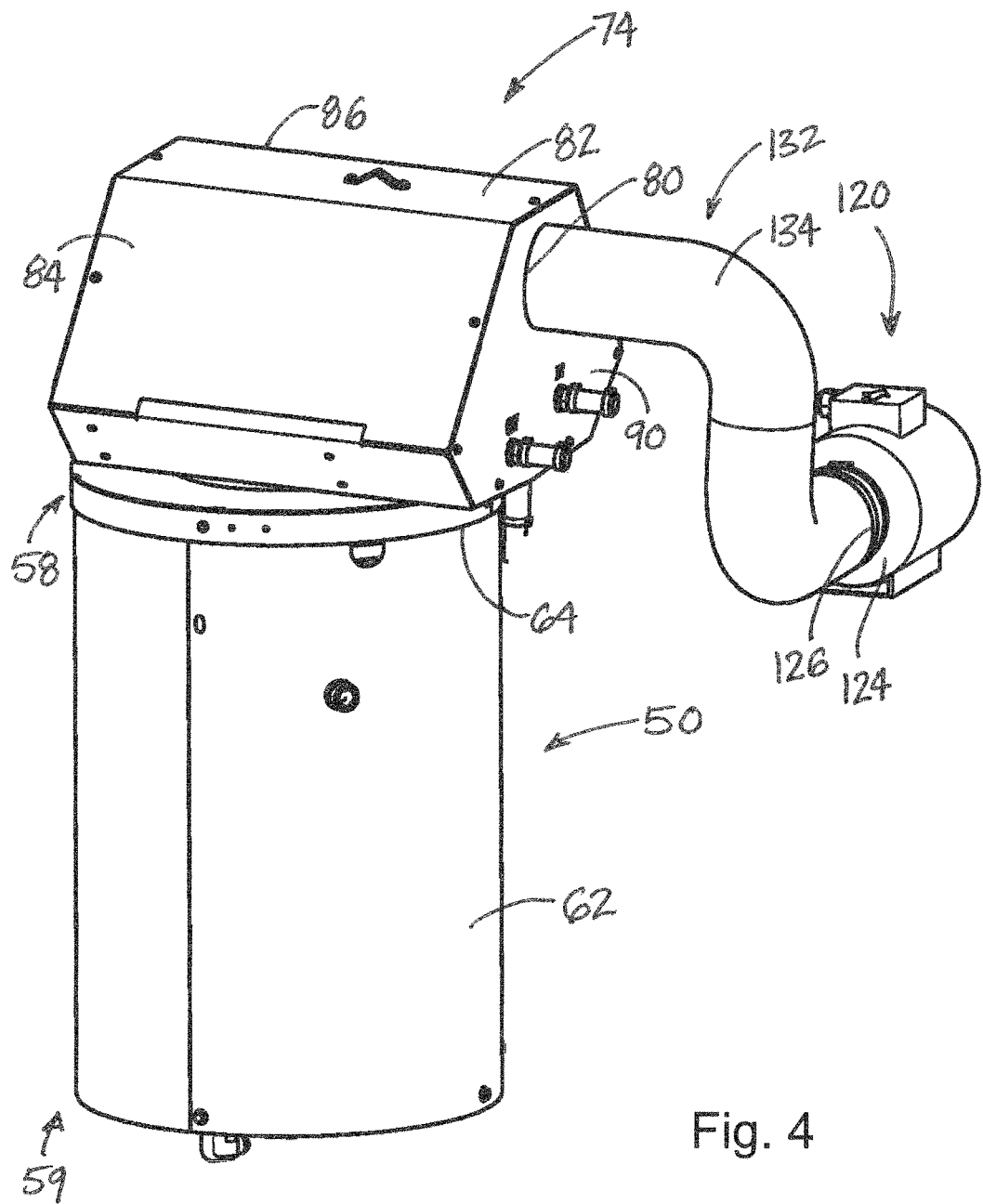
FIG. 4 is a schematic perspective view of an embodiment of the waste heat recovery system according to the present disclosure.
Figure 5A:
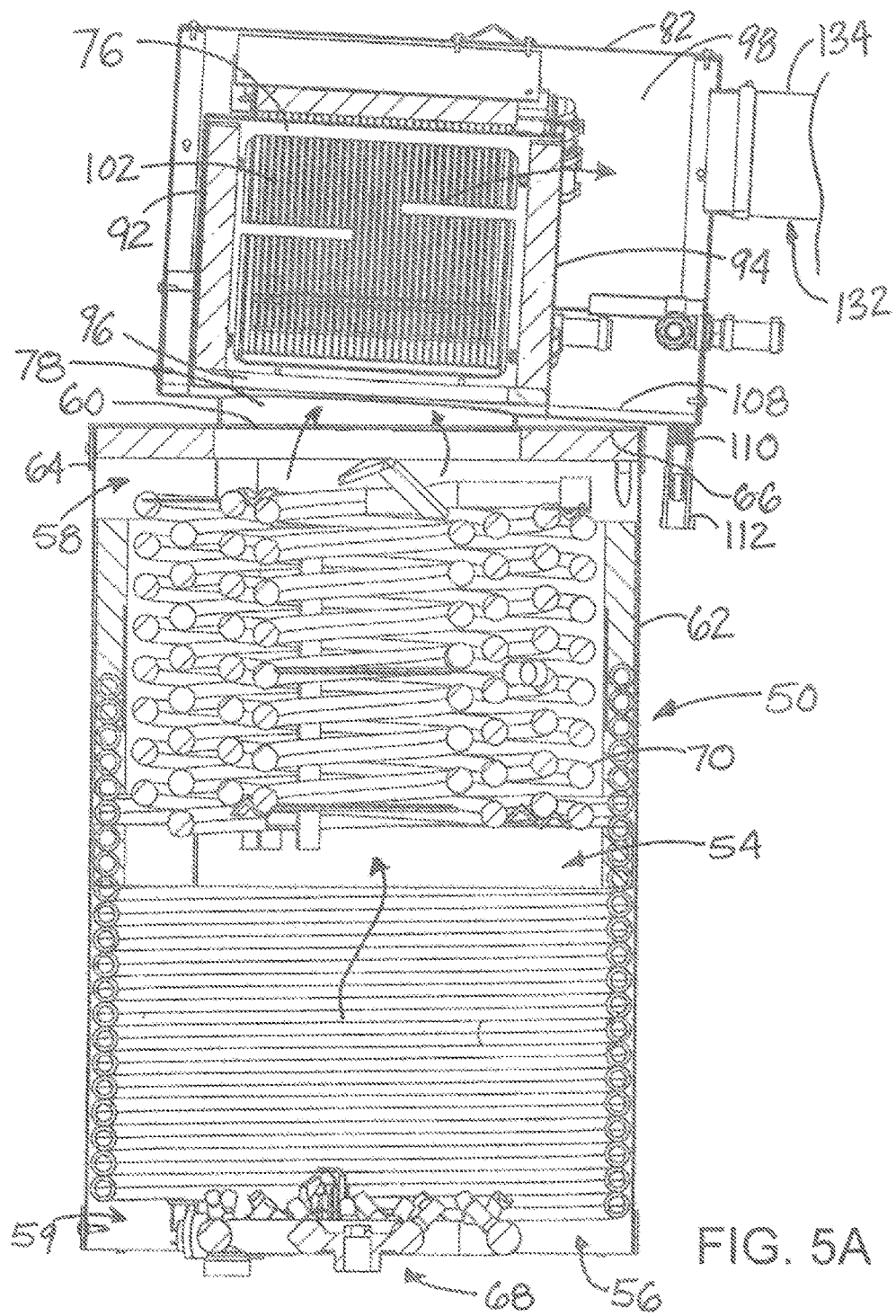
FIG. 5A is a schematic sectional view of elements of the system which are typically associated with and connected to the elements shown in FIG. 5B, according to an illustrative embodiment.
Figure 5B:
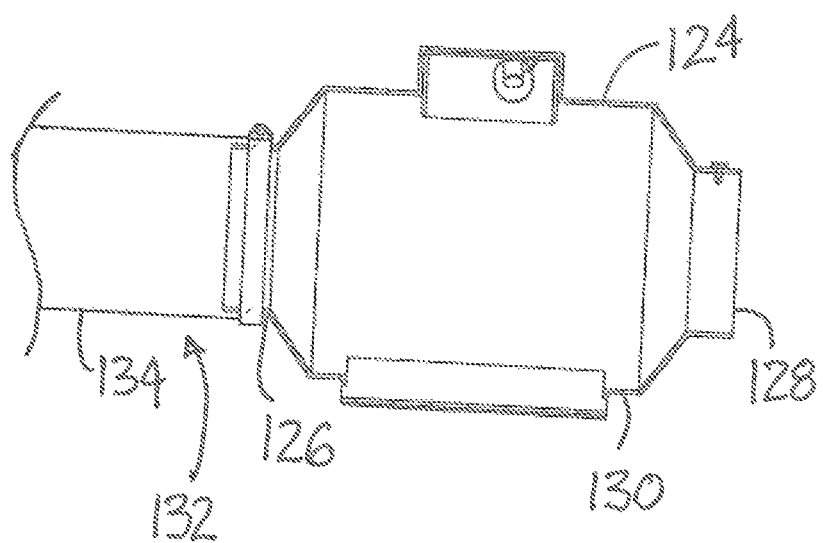
FIG. 5B is a schematic sectional view of elements of the system which are typically associated with and connected to the elements shown in FIG. 5A, according to an illustrative embodiment.
Figure 6:
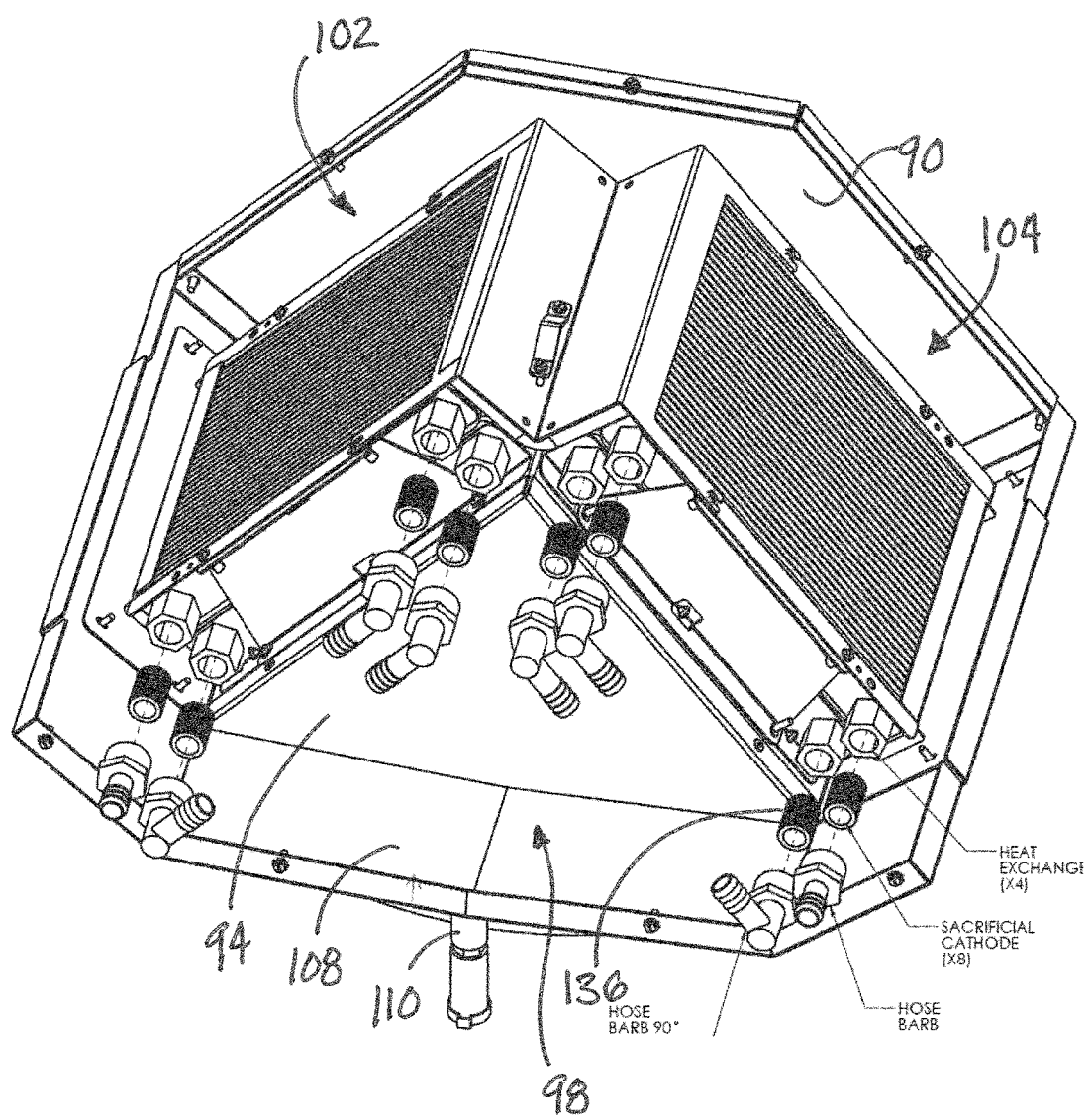
FIG. 6 is a schematic perspective view of the heat recovery assembly of the system, according to an illustrative embodiment, with portions of the housing removed to expose interior detail.
Figure 7:
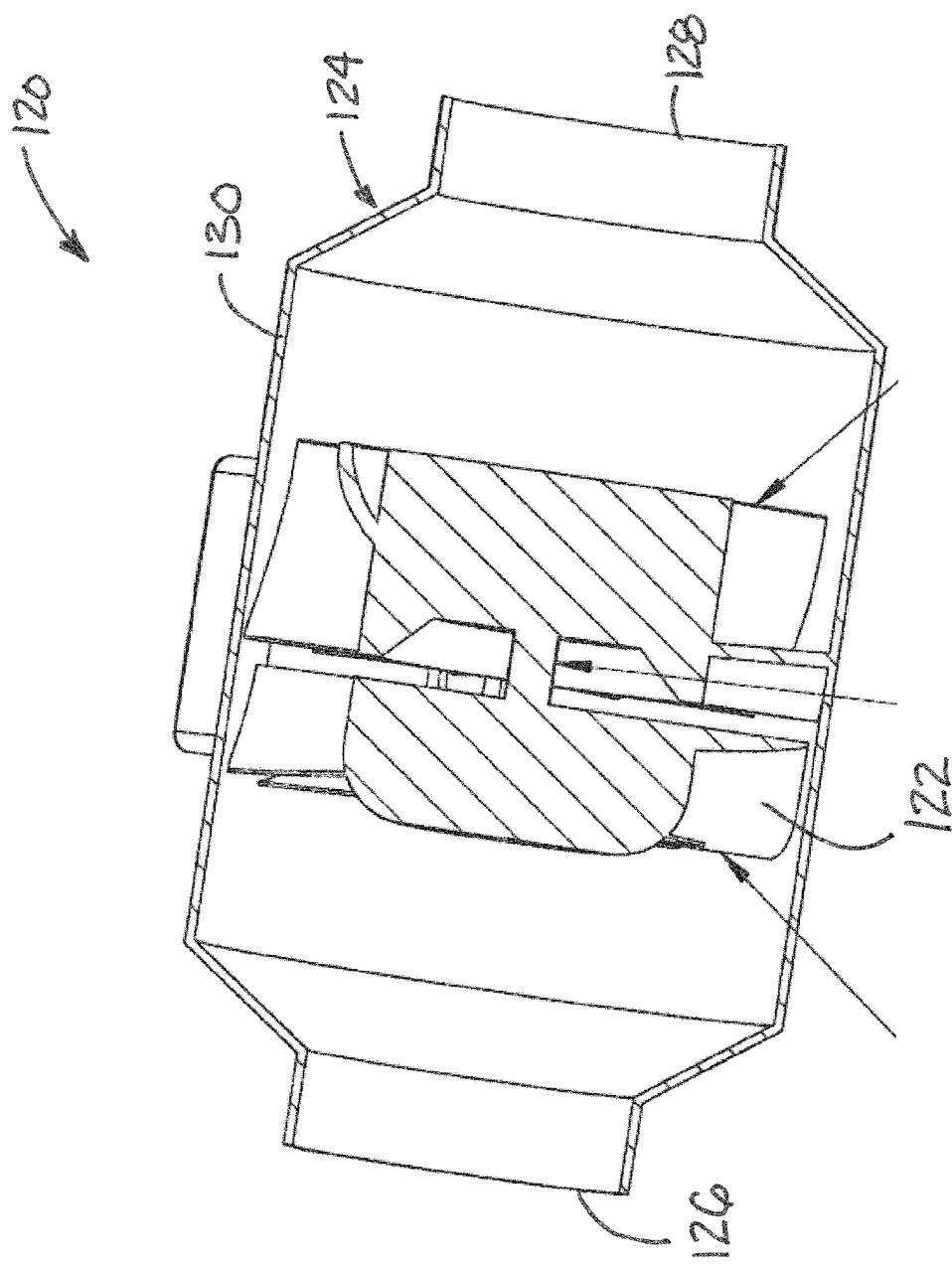
FIG. 7 is a schematic sectional view of one embodiment of exhaust gas movement device.

With reference now to the drawings, and in particular to FIGS. 1 through 7 thereof, a new waste heat recovery system for a fluid heater embodying the principles and concepts of the disclosed subject matter will be described.

Applicant has recognized that the system described in the copending patent application Ser. No. 12/566,429 is exceptionally effective for recapturing heat that in previous fluid heaters would have escaped to the environment through the exhausted combustion gases, wasting the energy used to generate that heat and requiring special venting structures for the extremely hot exhaust gases. Applicant also realized that the system of that disclosure is particularly suitable for heater applications in which the heating assembly includes a burner that creates a draft that drives the burning fuel/air mixture into the combustion chamber, and moves the combustion gases through the heating assembly and the heat recovery assembly. For example, burners designed for combusting diesel or oil as a fuel typically utilize a fan to blow air for combustion through the burner and fuel to facilitate combustion of the fuel. In most implementations the draft generated in the combustion air path prior to the burner is able to move the combustion gases through the heating assembly and the heat recovery assembly of the system.

Applicant has further recognized that in applications in which the burner is naturally aspirated, such as burners designed to combust natural gas or propane, the presence of the heat recovery assembly may present an impediment to the natural flow of the heated combustion gases. As a result, the gravity or convective-based flow of the heated gases which is otherwise effective to move the gases through the heating assembly may not be sufficient to also move the gases through the heat recovery assembly at an acceptable flow rate.

Although the use of a fan to drive air through the gas burner, similar to the oil burner configuration, is an option, the applicant has recognized that a more preferable option would be to pull the air (and the resulting combustion gases) through the heating assembly and the heat recovery assembly. However, the applicant has recognized that configuration as being highly problematic as the extremely hot combustion gases passing through a fan are likely to destroy the fan in a short period of time and cause longevity concerns, which is impractical and unacceptable for the normal and expected life of a fluid heater. Applicant has discovered that the implementation of the heat recovery assembly of the system, by recovering more heat from the combustion gases than previously recognized, can beneficially reduce the temperature of the combustion gases to a point that when the combustion gases pass through a fan, the fan is more capable of tolerating gases with these significantly lowered temperatures better. Testing has shown that, as a result of the lowered temperatures, the life of the fan is not likely to be adversely affected to the degree that the life is unacceptably short.

The disclosure relates to improvements that are particularly useful on a fluid heating apparatus 10, but may have other applications and thus should only be considered to be illustrative. Generally, the fluid heating apparatus heats a flow of fluid moving along a fluid path 12 extending through the apparatus 10 between a fluid inlet 14 and a fluid outlet 16, so that the temperature of the fluid exiting the fluid outlet is greater than the temperature of the fluid entering the fluid inlet. The fluid heating apparatus 10 may also increase a pressure of the fluid between the fluid inlet 14 and the fluid outlet 16, so that the fluid exiting the fluid outlet has a greater pressure than fluid entering the fluid inlet. In some implementations, the fluid heating apparatus 10 is utilized to wash objects using the hot fluid exiting the fluid outlet at high pressure, which can produce steam when the heated high pressure water is exposed to the atmosphere. Typically, but not necessarily, the fluid is a liquid and the liquid is water. The water at the inlet 14 may be at ambient temperature and a pressure that is supplied by a municipal water supply, or pumped from a tank or another liquid holding means, and the water at the outlet 16 may have a significantly higher temperature and pressure. The fluid heating apparatus 10 may be implemented on a relatively portable or a relatively stationary platform. For example, the apparatus 10 may be implemented on a trailer to provide portability, or a skid that may be picked up and transported between locations. For the purposes of this description, the apparatus 10 is provided with any suitable means of support to make it useful for the directed mode of use In greater detail, the fluid heating apparatus 10 may include a fluid accumulating tank 40 for accumulating fluid in the fluid path 12, although the presence of an accumulating tank 40 is not critical to the function of the apparatus. The fluid accumulating tank 40 may thus be in fluid communication with the fluid path 12, and an interior of the tank may form a portion of the fluid path. The tank 40 may function as an enlargement of the fluid path for accommodating an extra quantity of fluid so that the remainder of the fluid path between the tank 40 and the fluid outlet 16 is provided with a supply of fluid even if a main fluid supply is subject to pressure and flow rate variations. The tank 40 may have an auxiliary inlet 42 for an auxiliary flow of fluid described below. The fluid accumulating tank 40 may have an accumulating tank outlet 44.

The fluid heater apparatus 10 may also include a fluid pumping assembly 46 that is configured to increase a pressure characteristic of the fluid between the fluid inlet 14 and fluid outlet 16. The fluid pumping assembly 46 may comprise a fluid pump of any suitable type, such as a mechanical pump and may be operated by any suitable means, such as electricity or gas engine. The fluid pumping assembly 46 may be in fluid communication with, and form a portion of, the fluid path 12. In some embodiments, the fluid pumping assembly 46 is in fluid communication with the accumulating tank outlet 44 to draw fluid from the interior of the tank 40. The fluid pumping assembly 46 may thus increase a pressure of the fluid from a first, relatively lower pressure of the fluid in the interior of the accumulating tank 40 and raise it to a second, relatively higher pressure leaving the fluid pumping assembly at a pumping assembly outlet 48. The first pressure may be a pressure that is available from a conventional water supply system, or from other sources, and the second pressure may be a pressure that is utilized for high pressure washing. Illustratively, the first pressure may be in the range of 0 psi to approximately 200 psi, and in many applications the first pressure may be in the range of 0 psi to approximately 120 psi. The second pressure may range above approximately 500 psi.

A heating assembly 50 may be included in the heater apparatus 10 to heat the fluid between the fluid inlet 14 and the fluid outlet 16, and may form a portion of the fluid path 12 therebetween. The heating assembly 50 may be in fluid communication with the pumping assembly 46 via the pumping assembly outlet 48. The heating assembly 50 may have a heating assembly outlet 52, and the outlet 52 may form the fluid outlet 16 of the fluid heating apparatus 10.

In many embodiments of the apparatus 10, the heating assembly 50 includes a heating chamber 54, which may have any of a variety of different configurations including a vertical orientation where the exhaust gases of combustion move generally vertically (up and/or down) in the chamber, or a horizontal orientation where the exhaust gases move generally horizontally in the chamber. In some embodiments, the heating chamber 54 has an interior 56, and a top 58 and a bottom 59. The heating chamber 54 may have an exhaust opening 60 for exhaust gases to pass out of the interior 54 of the heating chamber. The heating assembly may define a first portion of a gas path through the apparatus 10, and the heating assembly may be configured so that exhaust gases from combustion occurring in the heating assembly enter the gas path and exit through the exhaust opening. The exhaust opening 60 may be located on a side of the heating chamber, but in the illustrative embodiments is located at or near the top 58 of the chamber. While the illustrative heating chamber 54 is generally vertically oriented, it should be recognized that many of the features discussed herein may apply to a heating chamber having a generally horizontal orientation.

In greater detail, the illustrative heating chamber 54 may comprise a perimeter wall 62 that defines the interior 56 of the heating chamber. The perimeter wall 62 may be substantially cylindrical in shape, and may be centered about a substantially vertical axis. The perimeter wall may incorporate an insulating material to reduce the temperature of the outer surface of the perimeter wall relative to the temperature in the interior 56. In some other embodiments, the perimeter wall as well as other walls may lack an insulation material but may include a space filled with stationary or moving air to provide some insulating effect.

The heating chamber 54 may also include a top wall 66 that is mounted on the perimeter wall 62 and that closes the top end 64 of the perimeter wall. The exhaust opening 60 may be formed in the top wall 66, although this is not critical in some implementations may be positioned in the perimeter wall 62, and may be located toward a top end 64 of the perimeter wall. With the exception of the exhaust opening 60, the top wall 66 may be continuous between the opening 60 and the extent of the perimeter wall.

The heating assembly 50 may further include a heat source such as a burner 68 or other combustion source that produces heated gases in the interior 56 of the heating chamber. For example, the burner 68 may be configured to burn a liquid fuel such as oil or a gaseous fuel such as natural gas or liquefied petroleum (LP) gas, as well as other hydrocarbon-based fuels. The burner 68 may have a variety of configurations. In an illustrative embodiment, the burner 68 may be positioned toward the bottom 59 of the heating chamber 54, and may be oriented to direct a flame and the exhaust gases from the flame in a substantially upward direction in the interior of the heating chamber. In other embodiments, a burner may be located toward the top of the heating chamber and direct the flame downwardly to create a downward (and sometimes then upward) flow of the heated gases. The combustion of fuel by the burner produces water vapor in the exhaust gases that are also produced by the combustion, as well as the water vapor that is present in the ambient air drawn into the burner to support the combustion. A fluid circulating conduit 70 of the heating assembly 50 may be positioned in the interior 56 of the heating chamber to circulate fluid in the fluid path in the exhaust gases produced by the burner. The fluid circulating conduit 70 may thus form a portion of the fluid path 12, and may be formed into a plurality of coils, although this configuration is not critical.

Significantly, the apparatus 10 includes a heat recovery assembly 74 that is configured to recover heat from the exhaust gases. The recovery of the heat from the exhaust gases may or may not occur after the exhaust gases have left or passed out of the interior of the heating assembly 50. The heat recovery assembly 74 may be configured such that exhaust gases emanating from the heating chamber pass through an interior 76 of the heat recovery assembly, where heat exchanging means are positioned to transfer the heat contained in the exhaust gases to another medium, such as fluid moving along the fluid path 12. The heat recovery assembly 74 may be primarily and substantially located outside of the heating assembly 50, although there may be some connection or integration of the recovery assembly 74 with the heating assembly 50 for the purposes of, for example, guiding the exhaust gases from the heating assembly to the recovery assembly.

The transfer of heat to the fluid in the fluid path 12 may occur before the pressure of the fluid has been increased, such as by the pumping assembly 46. Thus, in such embodiments, the heat recovery assembly 74 acts to pre-heat the fluid in the fluid path prior to the fluid being pumped to a higher pressure, and the heat recovery assembly 74 may have or form the fluid inlet 14 for receiving fluid into the fluid heating apparatus 10. This is in contrast to the fluid moving through the heating assembly 50, the pressure of which has been raised by the pumping assembly 46 or other suitable means. Significantly, the elements of the heat recovery assembly 74 are not subjected to the higher pressures that are present in the fluid flow moving through the heating assembly 50 and out of the fluid outlet 16 of the apparatus, and as a result, elements of less sturdy and bulky character may be utilized in the heat recovery assembly to decrease manufacturing costs and increase the transfer of heat.

The heat recovery assembly 74 may have an exhaust gas intake 78 for receiving exhaust gas into the assembly 74 and an exhaust gas outlet 80 for expelling the exhaust gas from the assembly 74. The exhaust gas intake 78 may receive exhaust gases from the heating assembly 50, and those gases may then be passed out of the interior 76 of the heat recovery assembly through the outlet 80. The heat recovery assembly 74 may define a second portion of the gas path that is in fluid communication with the first portion of the gas path defined by the heating assembly.

In greater detail, the heat recovery assembly 74 may comprise a housing 82 although the use of a housing is not critical to the apparatus. The housing 82 may be mounted on the heating assembly 50, although other positions and relationships to the heating assembly may be utilized. The housing 82 may define the interior 76 (or a portion thereof) of the heat recovery assembly 74, and the interior of the housing may include an entry subchamber 96 and an exit subchamber 98. The entry subchamber may be in fluid communication with the exhaust gas intake of the heat recovery assembly. In the illustrative embodiments, the housing 82 may be positioned on the top wall 66 of the heating assembly 50 and may be positioned over the exhaust opening 60 so as to receive gases passing through the exhaust opening. The exhaust gas intake 78 may be co extensive with the exhaust opening so that all of the exhaust gases from the exhaust opening move into the interior 76 of the heat recovery assembly. The housing 82 may comprise a first side wall 84 that may lie or extend in a plane that is inclined with respect to a vertical plane, and a second side wall 86 that is positioned in substantial opposition to the first side wall and may also lie in a plane that is inclined with respect to a vertical plane. The first 84 and second 86 side walls may each have major portions that are oriented substantially perpendicular to each other with a peak thereby at the juncture of the major portions. The housing may also have end walls 90 extending between the first and second side walls to form a closed perimeter about the interior of the housing. The end walls 90 may be positioned in opposition to each other, and a first end wall may have the exhaust gas outlet 80 formed therein.

The heat recovery assembly 74 may further include at least one heat exchanger 102, which may be positioned in the interior 76 of the housing 82. The at least one heat exchanger 74 may be configured to capture heat from exhaust gases passing from the entry subchamber 96 to the exit subchamber 98. In the illustrative embodiments, a plurality of heat exchangers may be utilized and illustratively a pair of heat exchanger assemblies 102, 104 is employed in the assembly 74, although one or more than two exchangers may be used. The heat exchangers may comprise air to liquid heat exchangers, so that heat from the exhaust gases passing over the heat exchangers is transferred to the fluid or liquid moving through the fluid path. For example, each of the heat exchangers may comprise a conduit through which the fluid on the fluid path passes, and fins mounted on the conduit that draw heat from the gases passing over them and transfer the heat to the conduit (and in turn the fluid passing through the conduit). The heat exchangers are not limited to this configuration, although this configuration has been found to be highly suitable for the purposes of the apparatus 10. More specifically, the inclusion of fins on the heat exchangers, while beneficial, is not required.

In embodiments in which multiple heat exchangers are utilized, the heat exchangers 102, 104 may be configured to encounter the flow of exhaust gases in parallel with respect to each other, although two or more exchangers may be oriented in a serial arrangement to the exhaust flow such that the exhaust flow encounters each of the exchangers one after another. In embodiments in which multiple heat exchangers are employed, the heat exchangers may be positioned in substantially the same plane so that parallel air flows through the exchangers may be used. Other configuration of the multiple heat exchangers may be employed, such as where the planes of the heat exchangers are angled with respect to each other. For example, the planes of the heat exchangers may be in a vertically-inclined arrangement that forms an inverted V shape such that upper end of the exchangers are closer to each other and the lower ends are further apart. The flow of the exhaust gases passing through the exchangers may separate into divergent flows.

Illustratively, the first 102 and second 104 heat exchanger assemblies may be positioned in a tented configuration in which the heat exchanger assemblies converge toward a top of the housing 82 of the heat recovery assembly and diverge toward a bottom of the housing. The heat exchanger assemblies 102, 104 may be positioned over the exhaust gas intake 78 and the entry subchamber 96 may be positioned below the assemblies 102, 104 and at least a portion of the exit subchamber 98 may be positioned above the assemblies 102, 104. In some of the embodiments, each of the exchanger assemblies 102, 104 may include a pair of heat exchangers positioned face to face such that exhaust gases moving through a first one of the pair of heat exchangers moves through a second one of the pair of heat exchangers, The major face or plane of the exchangers may be inclined or tilted at angles between 0 and approximately 90 degrees (inclusive), and in some embodiments an angle of approximately 5 degrees to approximately 45 degrees from a vertical plane. In this inclined orientation, the plane of the fins of the heat exchanger may be vertically oriented. One advantage of the inclined orientation is that dripping of the condensation on the fins from the fins is facilitated, as the edges of the fins are also inclined and do not present a horizontal edge. Other arrangement geometries for multiple heat exchangers may also be used.

In the illustrative embodiment, the fluid path 12 passes through the one or more heat exchangers in series, so that the fluid moving along the path 12 passes through all of the exchangers. Optionally, the fluid path may move through multiple heat exchangers in parallel. This parallel flow may be accomplished by dividing the fluid flow downstream from (after) the fluid inlet 14, but upstream (before) the fluid path encounters the exchangers. The fluid flow may be rejoined downstream from the heat exchangers. It should be recognized that the fluid path 12 could pass through multiple exchangers in both series and parallel arrangements. Also, a plurality of heat exchangers may include up to four or more heat exchangers. While a heat exchanger with a generally planar configuration is depicted, it is contemplated that heat exchangers with other configurations may be employed, such those having cylindrical and even domed shapes as well as other shapes.

The housing 82 may further include a pair of capture walls 92, 94, which, with the heat exchanger assemblies, separate the entry subchamber 96 from the exit subchamber 98 in the interior of the housing. The capture walls 92, 94 may extend between the heat exchanger assemblies 102, 104 to form the entry subchamber on an entry side of the heat exchanger assemblies, which is generally below the assemblies 102, 104. The heat exchanger assemblies may have an exit side located above the heat exchanger assemblies, with the exit subchamber being located above the heat exchanger assemblies.

An optional feature of the apparatus 10 is the capability to recover heated condensation from heat exchangers, so that the collected condensation may optionally be introduced into the fluid flow in the fluid path, although the collected condensation may be disposed of in other ways, such as by, for example, draining the condensation to the ground or collection in a separate tank for periodic disposal. Advantageously, the collection of condensed water from the exhaust gases may also function to collect particulate matter from the exhaust gases as the particulate matter collects on the heat exchanger with the condensed vapor, and thus may provide a partial "scrubbing" function on the exhaust gases.

To reintroduce the collected condensation into the fluid flow, the illustrative embodiments of the apparatus 10 include a condensation collection assembly 108 which employs a drain 110 in the bottom of the housing 82 to drain condensation that drips from the heat exchangers into the interior of the housing of the heat recovery assembly 74. The liquefied condensation collects in the bottom of the interior of the housing, and is able to drain from the interior through a drain conduit 112. The drain conduit 112 is in fluid communication with the fluid path 12, such as in communication with the auxiliary inlet 42 of the accumulating tank 40, where the condensation liquid is able to mix with the fluid that has entered through the fluid inlet 14.

A significant aspect of the disclosure is the gas movement device 120 which may be useful to move air into the burner 68, move combustion gases from the burner through the heating assembly 50, and/or move exhaust gases from the heating assembly 50 through the heat recovery assembly 74. The gas movement device 120 may be configured to pull gases through the first and second portions of the gas path to the gas movement device, and then out to the atmosphere. In some of the more preferred embodiments of the apparatus 10, the movement of air and gas may be accomplished by pulling the gases through the gas path defined by, for example, the burner, the interior 56 of the heating assembly and the interior 76 of the heat recovery assembly along the path defined by these structures. The gas flow along the path may thus be induced rather than blown through the path. While the temperature of combustion gases exiting the exhaust opening of the heating assembly are typically on the order of 800 degrees Fahrenheit or more, the temperature of combustion gases exiting the heat recovery assembly have typically been observed in the range of approximately 85 degrees F. to approximately 125 degrees F., which presents a much less harsh and damaging environment for the exhaust gas movement device.

Illustratively, the gas movement device 120 may include a fan 122 which may be an axial flow fan although other fan configurations may be employed. The gas movement device 120 may also include a casing 124 with the fan 122 positioned therein. The casing 124 may define a gas inlet 126 and a gas outlet 128, with the fan being positioned generally in between the gas inlet and outlet such that operation of the fan pulls exhaust gases into the gas inlet and pushes the gases out of the gas outlet. The casing 124 may include a peripheral wall 130 that extends about the fan 122 and extends between the gas inlet and gas outlet. In some embodiments, the peripheral wall may include a sound absorbent material to reduce the sound radiated. It should be recognized that, while the use of a fan may be preferred for some embodiments, other means for drawing or pulling the gases through the gas path may be utilized, including, for example, a venturi. Based upon this disclosure, those skilled in the art will recognize other suitable equivalents.

An exhaust guide 132 may be provided to guide exhaust gases from the heat recovery assembly 74 to the exhaust gas movement device 120. In some embodiments, the exhaust guide may comprise a duct 134 that forms a passage for the exhaust gases to flow between the heat recovery assembly 74 and the exhaust gas movement device. The duct 134 may be connected to the housing 82 of the heat recovery assembly and the casing 124 of the exhaust gas movement device. The passage of the duct 134 may be in fluid communication with the exhaust gas outlet 80 of the heat recovery assembly and the gas inlet 126 of the exhaust gas movement device in a substantially air tight manner so that operation of the fan 122 is able to pull gases from the heating assembly through the heat recovery assembly and into the casing of the movement device 120, As a further option, as a measure to reduce corrosion of the heat exchangers of the heat recovery assembly, one or more sacrificial anodes or cathodes may be attached to the heat exchangers in electrical communication with the metal parts of the exchangers and the fittings associated therewith. Illustratively, a sacrificial anode may be incorporated as a nipple 136 between the heat exchangers and the fittings of the hoses or conduits forming the fluid path of the apparatus.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A fluid heating apparatus having a fluid inlet, a fluid outlet, and a fluid path extending between the fluid inlet and fluid outlet, the apparatus comprising:
    a fluid pumping assembly configured to increase a pressure characteristic of the fluid between the fluid inlet and fluid outlet, the fluid pumping assembly forming a portion of the fluid path to increase the pressure of fluid moving along the fluid path;
    a heating assembly configured to heat the fluid between the fluid inlet and the fluid outlet, the heating assembly forming a portion of the fluid path to increase a temperature of the fluid moving along the fluid path, the heating assembly defining a first portion of a gas path such that exhaust gases from combustion in the heating assembly enter the gas path;
    a heat recovery assembly configured to recover heat from the exhaust gases, the heat recovery assembly forming a portion of the fluid path to transfer recovered heat to fluid moving through the fluid path, the heat recovery assembly defining a second portion of the gas path in fluid communication with the first portion of the gas path; and
    a gas movement device configured to pull gases through the first and second portions of the gas path to the gas movement device.

2. The apparatus of claim 1 wherein the heat recovery assembly is configured to heat fluid on the fluid path prior to the fluid passing through the heating assembly.

3. The apparatus of claim 1 wherein the heat recovery assembly is configured to heat fluid on the fluid path prior to the fluid path passing through the fluid pumping assembly.

4. The apparatus of claim 1 wherein the heat recovery assembly includes a plurality of heat exchangers.

5. The apparatus of claim 4 wherein the fluid path passes through the plurality of heat exchangers in a series arrangement.

6. The apparatus of claim 4 wherein the fluid path passes through the plurality of heat exchangers in a parallel arrangement.

7. The apparatus of claim 4 wherein exhaust gases from the heating assembly pass through the plurality of heat exchangers of the heat recovery assembly in parallel.

8. The apparatus of claim 4 wherein exhaust gases from the heating assembly pass through the plurality of heat exchangers of the heat recovery assembly in series.

9. The apparatus of claim 1 additionally comprising a fluid accumulating tank in fluid communication with the fluid path; and wherein the fluid path passes through the heat recovery assembly prior to passing through the fluid accumulating tank.

10. The apparatus of claim 1 wherein the heat recovery assembly includes a condensation collection assembly configured to collect condensation on a heat exchanger of the recovery assembly.

11. The apparatus of claim 10 wherein the condensation collection assembly directs condensed fluid collected into the fluid path.

12. The apparatus of claim 11 additionally comprising a fluid accumulating tank in fluid communication with the fluid path; and
    wherein the condensed fluid is directed to the fluid accumulating tank.

13. The apparatus of claim 10 wherein the condensation collection assembly further collects particulate matter in the collected condensation.

14. The apparatus of claim 1 wherein the gas movement device comprises a fan.

15. The apparatus of claim 14 wherein the gas movement device comprises a fan positioned in a casing, the heat recovery assembly comprising a housing, and an exhaust guide guides exhaust gas from the housing of the heat recovery assembly to the casing of the gas movement device.

16. The apparatus of claim 1 additionally comprising a fluid accumulating tank in fluid communication with the fluid path; and wherein the fluid pumping assembly draws fluid from the fluid accumulating tank and directs fluid into the heating assembly through the fluid path.

17. The apparatus of claim 1 additionally comprising a burner configured to burn a gaseous fuel to produce heated gases in a heating chamber of the heating assembly.

18. The apparatus of claim 17 wherein the heating assembly includes a fluid circulating conduit forming a portion of the fluid path and being positioned in the heating chamber, the fluid circulating conduit being formed into a plurality of coils.

19. A fluid heating apparatus having a fluid inlet, a fluid outlet, and a fluid path extending between the fluid inlet and fluid outlet, the apparatus comprising:
 a fluid pumping assembly forming a portion of the fluid path and pumping fluid on the fluid path to increase a pressure characteristic of fluid moving along the fluid path;
 a heating assembly forming a portion of the fluid path and heating fluid on the fluid path to increase a temperature characteristic of the fluid moving along the fluid path, the heating assembly defining a first portion of a gas path such that the gas path carries pre-combustion gases for fuel combustion by the heating assembly and such that exhaust gases from the fuel combustion in the heating assembly enter the gas path;
 a heat recovery assembly including at least one heat exchanger to recover heat from the exhaust gases, the heat recovery assembly forming a portion of the fluid path to transfer recovered heat to fluid moving through a portion of the fluid path forming the at least one heat exchanger, the heat recovery assembly defining a second portion of the gas path in fluid communication with the first portion of the gas path; and
 a fan configured to move gases through the first portion of the gas path for the heating assembly and the second portion of the gas path for the heat recovery assembly such that the exhaust gases pass through the fan.

20. A fluid heating apparatus having a fluid inlet, a fluid outlet, and a fluid path extending between the fluid inlet and fluid outlet, the apparatus comprising:
 a fluid pumping assembly forming a portion of the fluid path and pumping fluid on the fluid path to increase a pressure characteristic of fluid moving along the fluid path between the fluid inlet and outlet;
 a heating assembly forming a portion of the fluid path and heating fluid on the fluid path to increase a temperature characteristic of the fluid moving along the fluid path between the fluid inlet and outlet, the heating assembly defining a first portion of a gas path such that the gas path carries pre-combustion gases for combustion of a gaseous fuel by the heating assembly and such that exhaust gases from combustion of the gaseous fuel in the heating assembly enter the gas path;
 a heat recovery assembly defining a second portion of the gas path in fluid communication with the first portion of the gas path to recover heat from the exhaust gases, the heat recovery assembly including at least one heat exchanger forming a portion of the fluid path to transfer recovered heat to fluid moving through a portion of the fluid path formed by the at least one heat exchanger; and
 a fan positioned in a casing forming a portion of the gas path and operative to move gases through the first portion of the gas path for the heating assembly and the second portion of the gas path for the heat recovery assembly.

21. The apparatus of claim 19 wherein the fan is configured to pull gases through the first portion of the gas path and the second portion of the gas path.

22. The apparatus of claim 19 wherein the heat recovery assembly is configured to heat fluid on the fluid path prior to the fluid passing through the heating assembly.

23. The apparatus of claim 19 wherein the heat recovery assembly is configured to heat fluid on the fluid path prior to the fluid path passing through the fluid pumping assembly.

24. The apparatus of claim 19 wherein the fluid path passes through a plurality of heat exchangers of the heat recovery assembly in a series arrangement.

25. The apparatus of claim 19 wherein the heat recovery assembly includes a condensation collection assembly configured to collect condensation on a heat exchanger of the recovery assembly.

* * * * *